Feb. 23, 1971 H. L. MONELL 3,565,535
LINEAR DENSITOMETER
Filed Oct. 14, 1968

INVENTOR
Howard L. Monell

By Smyth, Roston & Pavitt
ATTORNEYS

United States Patent Office 3,565,535
Patented Feb. 23, 1971

3,565,535
LINEAR DENSITOMETER
Howard L. Monell, Los Angeles, Calif., assignor to Calbiochem, Los Angeles, Calif., a corporation of California
Filed Oct. 14, 1968, Ser. No. 767,332
Int. Cl. G01n 21/06, 21/34, 33/16; G01j 1/00
U.S. Cl. 356—201                                 11 Claims

ABSTRACT OF THE DISCLOSURE

The present invention is directed to an optical densitometer which provides a direct linear reading of optical density from a non-linear input of light intensity. The present invention uses a bridge measuring circuit including a photoresistive cell which has a non-linear characteristic to provide a first order compensation for the non-linear character of the input light intensity to the photosensitive cell and, in addition, uses a semiconductor device such as a silicon-controlled rectifier in combination with the bridge measuring circuit to control the current flowing through an output meter and with the semiconductor device, such as the silicon-controlled rectifier, providing a second order compensation so that the output indication is an extremely accurate direct linear reading of optical density.

---

Figure 1:
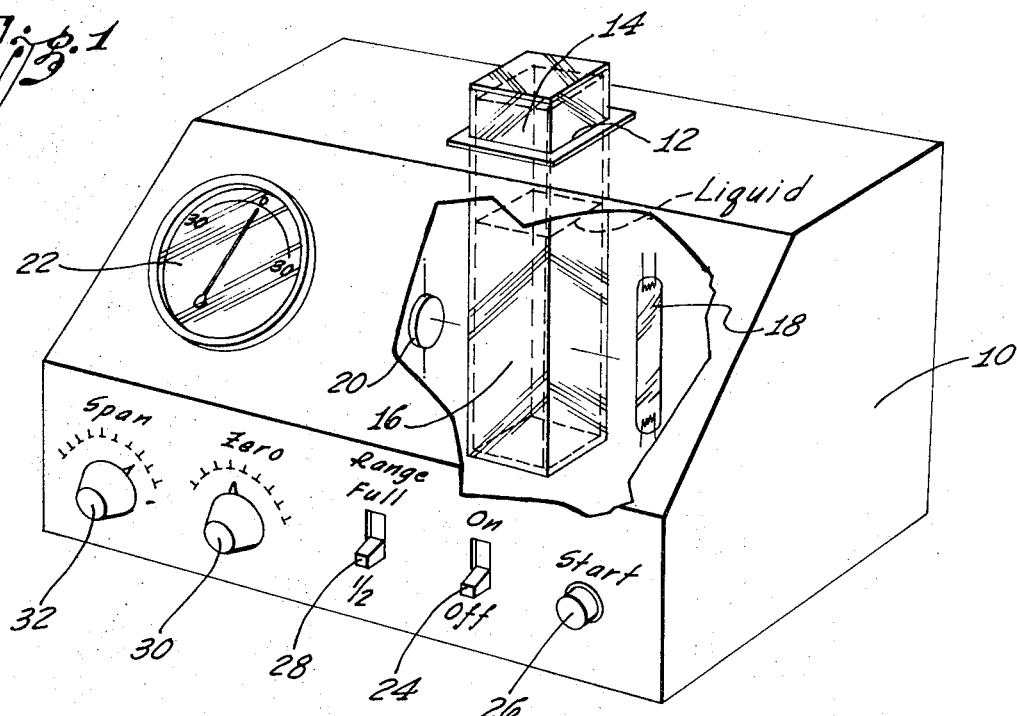

An increasingly important medical testing instrument is a densitometer which provides an output reading of optical density. Specifically, various functions of the body and other body properties may be checked by testing specimens which include particular chemical reagents and wherein the optical density of the specimen changes in accordance with the bodily function of the individual patient. As an example, one specific type of densitometer uses light in the near ultraviolet region and various tests which may be performed are glucose, LDH, SGOT, α HBDH, alcohol and other tests where the specimen has an absorption band in the near ultraviolet region. For example, glucose testing is extremely important and it would be desirable to have a doctor perform this test in his office. The testing for alcohol is important to law enforcement agencies and it would be desirable to provide for an accurate testing of alcohol in the field. Therefore, the present invention is directed to an inexpensive, portable, easy-to-operate, direct-reading optical densitometer which lends itself, because of its cost and portability, to be used by a doctor in his office or to be carried by law enforcement officers in their vehicle.

In order to provide for an effective output representation of the chemical reaction within the specimen, it is desirable that the optical densitometer produce a direct linear optical density readout. All of the various tests which may be performed by the optical densitometer of the present invention result from the measurement of light which passes through the specimen. Since the intensity of the output light from the specimen varies non-linearly in accordance with the absorption of the specimen, the intensity of the output light does not have a linear characteristic. The present invention compensates for the non-linear characteristic to provide for a direct linear optical density readout from the optical densitometer of the present invention. The present invention provides for an improvement in the linear characteristic of the output indication and specifically uses a semiconductor element in circuit with the measurement bridge to provide for a second order compensation of the non-linear characteristic of the photoresistive cell. Specifically, the present invention may use a silicon-controlled rectifier in a novel way in combination with and across a measurement bridge including a photoresistive element so as to control the current through an output meter and with the current through the output meter further compensated to provide for a direct linear optical density readout.

The optical densitometer of the present invention may also be provided with means to stabilize the measurement circuit so that fluctuations in the line voltage do not produce substantial changes in the output reading. Other advantages in the optical densitometer of the present invention are its versatility and simplicity so that the instrument may be very readily adapted to provide for a plurality of tests from the same instrument without increasing the cost of the instrument.

Figure 2:
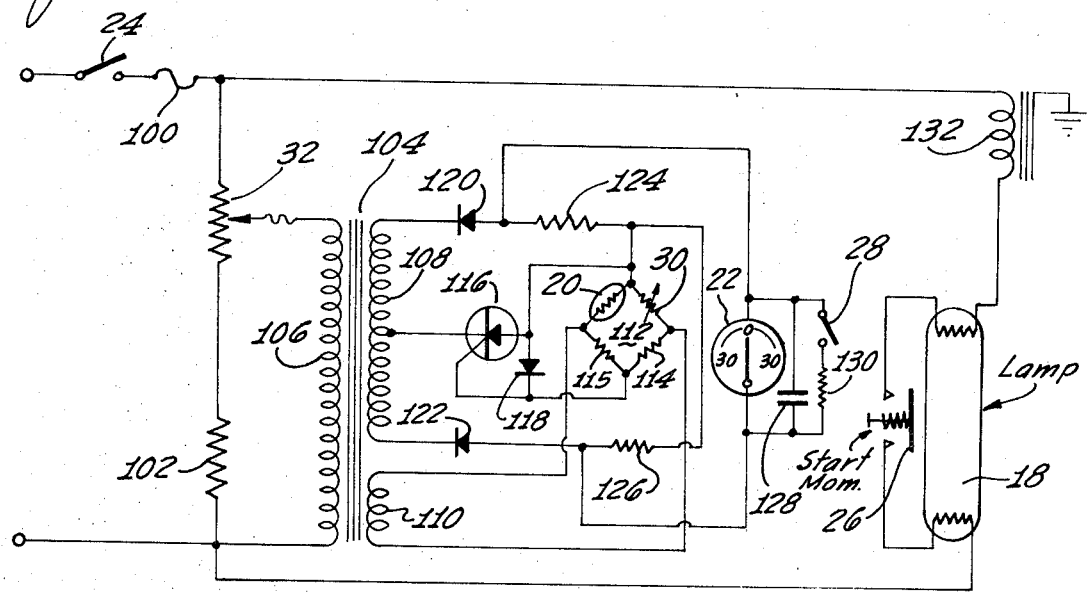

A clearer understanding of the optical densitometer of the present invention may be had with reference to the following description and drawings wherein:

FIG. 1 illustrates a front view with a partially broken away section showing an optical densitometer of the present invention; and FIG. 2 is a schematic of a particular circuit incorporating the features of the present invention.

In FIG. 1, an outer housing 10 is used to enclose various components of the present invention. The housing 10 includes an opening 12 for receiving a cuvette 14 which cuvette contains a liquid specimen 16 which is to be measured. Specifically, the liquid 16 is a specimen which has an absorption band in accordance with the particular chemical test. For example, the liquid specimen 16 may be used to provide for a glucose test or for an alcohol test.

A source of light 18 may provide output light in the near ultraviolet region, which light is directed through the liquid specimen 16 in the cuvette 14. The intensity of the light output from the specimen is measured by a change in resistance of a photoresistive cell 20 and an output reading is provided by an output indicator 22 which may be a center null ammeter. It is to be appreciated that the output indicator 22 need not be a center null meter but may be a unidirection meter having a zero reading at a lefthand position. The present invention provides for the versatility of measuring a change in the opaqueness of the specimen and either a center null meter as shown in FIG. 1 may be used or some sort of a reversing switch arrangement may be used with a unidirection meter.

The optical densitometer of FIG. 1 includes various controls. For example, the optical densitometer of FIG. 1 may include an on-off switch 24 and a start switch 26 which is specifically used to start the source of ultraviolet light 18. It is to be appreciated that tests other than that in the near ultraviolet region may be used and therefore the light source 18 may be a light source which produces light at other wavelengths.

The optical densitometer of FIG. 1 may also have a range switch 28 which controls the range of the output indication from meter 22. Although in FIG. 1 this is shown to either be a full range or to be one-half of the full range, it is to be appreciated that many more ranges may be provided by a switching circuit. Finally, the optical densitometer of FIG. 1 may include a zero control 30 and a span control 32. The zero control provides for the zeroing of the meter 22 and the span control 32 provides for the full scale reading of the meter 22.

In FIG. 2 a schematic of a specific embodiment of an optical densitometer incorporating the features of the present invention is shown. The same reference characters are given to those elements in FIG. 2 which are substantially identical to that shown in FIG. 1.

In FIG. 2 the switch 24 controls the application of line voltage to the optical densitometer of the present invention. The fuse 100 may be used to guard the circuit in case of an overload. The span adjustment 32 may be a potentiometer which, in combination with a resistor 102, forms a voltage divider circuit to control the voltage applied to the circuit of FIG. 2.

A transformer 104 includes a single primary 106, a first center-tapped secondary 108 and a second secondary winding 110. Actually, the output voltage across both windings 108 and 110 may be substantially identical and, as an example, a value of 25 volts may be used as the output from the transformer 104. The output from the winding 110 is connected across two terminals of a bridge circuit 112. The bridge circuit includes a photoresistive element 20, a variable resistor 30 which serves as a zero adjustment, and a pair of resistors 114 and 115 to complete the bridge circuit.

Connected across the opposite two terminals of the bridge 112 is a semiconductor device such as a silicon-controlled rectifier 116. Specifically, two terminals of the silicon-controlled rectifier are connected across the bridge circuit and the third terminal is connected to the center tap of the secondary winding 108. As may be seen from the drawing, the anode and gate terminals are connected across the bridge circuit, while the cathode terminal is connected to the center tap of the secondary winding of the transformer. A diode 118 prevents current from flowing in the wrong direction to the silicon-controlled rectifier 116.

The circuit of FIG. 2 also includes a pair of diodes 120 and 122 which prevent the flow of current around the outside loop of the measurement circuit and force the current to flow through the silicon-controlled rectifier 116. A pair of resistors 124 and 126 control the amplitude of the output current. Connected across the measuring circuit is the ammeter 22 shown in FIG. 1 which measures the current and provides for an output indication. A capacitor 128 operates as an integrator so that the output indication shown by the meter 22 is stabilized and does not fluctuate.

The switch 28 controls the placing of a resistor 130 in parallel with the meter 22. In the embodiment of the invention shown in FIG. 2, the resistor may have a value so as to change the range of the meter by one-half. It is to be appreciated, however, that a plurality of such resistors may be used so as to have a plurality of ranges for the meter 22. The light circuit includes the lamp 18 plus the start switch 26 and further includes a ballast 132 which limits the current through the light source 18 and prevents an excessive drain of current which could damage the light source 18.

In the embodiment of FIG. 2, the operation of the optical densitometer would be as follows. Once the switch 24 is closed, power is applied to the measuring circuit. However, in order to start the light source 18, the switch 26 may be momentarily depressed so as to rapidly increase the current flow through the light source 18. Once the light source 18 has been started, a lower current will maintain the light source on and the switch 26 may be released.

A cuvette such as as cuvette 14 shown in FIG. 1 is inserted in the opening 12, but the cuvette may contain a blank specimen so that the optical densitometer may be zeroed. The resistor 30, therefore, has its value adjusted so as to zero the position of the indicator of the meter 22. The span adjustment 32 may also be controlled so as to provide a full scale indication of the meter when the light between the light source 18 and the photocell 20 is decreased by a known absorbance standard provided by a cuvette containing a liquid providing this standard.

The test specimen is then inserted into the optical densitomer shown in FIG. 1 to allow the light from the light source 18 to pass through the cuvette 14 containing the test specimen 16 and onto the photoresistive cell 20. As indicated above, the intensity of the light and its wavelength are in accordance with the absorption band of the liquid specimen 16. However, this light output is not linear with linear changes in absorption of the test specimen. The photoresistor is therefore designed to have a non-linear characteristic to compensate for the non-linearity of the light impinging on the photoresistive cell 20. However, the photoresistive cell cannot provide for a complete linearization of the output reading and the present invention includes a semiconductor device such as a silicon-controlled rectifier to provide a second order of compensation.

When the test sample is inserted, the resistance of the photosensitive element 20 changes, thereby producing an output flow of current from the bridge 112. The output current is produced since the winding 110 provides a voltage across the bridge 112 and the change in resistance of the photosensitive element 20 provides for an unbalance of the bridge circuit. The measuring circuit provides a current flow of either one of two directions, depending upon whether the specimen becomes more opaque or less opaque, and the present invention allows for the reading of specimen which becomes more or less opaque. Assuming that the sample is more opaque, the resistance of the photoresistive cell 20 increases and the current flow ultimately through the meter 22 is in a direction to show this increase in resistance.

When the bridge becomes unbalanced, an output current flows through the meter 22 and at the same time this output current is controlled by the silicon-controlled rectifier 116 since the silicon-controlled rectifier is across the output of the bridge. Therefore, the silicon-controlled rectifier is designed to provide for a second order compensating effect so that the output readout from the meter 22 is more linear than would be possible without the use of the silicon-controlled rectifier 116. The output from the bridge, therefore, has a portion diverted through the silicon-controlled rectifier, which portion changes as the output increases and the change is non-linear so as to, as indicated above, provide for the second order compensation in conjunction with the first order compensation provided by the non-linear characteristic photoresistive cell 20.

The diodes 120 and 122 prevent the current from flowing in the outside loop including the secondary winding 108, the diodes 120 and 122, and the resistors 124 and 126. Essentially, the diodes force the current to go through the silicon-controlled rectifier 116. The diode 118 in turn controls the current to flow in only a particular direction through the silicon-controlled rectifier 116. The current always flows through the silicon-controlled rectifier 116 in the same direction, but the direction of current may change through the meter 22 depending upon the nature of the test specimen.

The present circuit shown in FIG. 2 also provides for great stability in the output reading. First of all, the use of the center-tapped secondary winding 108 of the transformer 104 reduces the effect of line fluctuations on the output signal. In addition, the output current through the meter 22 is essentially an A-C current and the capacitor 128 provides for an integration of this A-C current so that the output current through the meter 22 is the D-C average of the A-C current. The A-C current, of course, is displaced from the zero line so that the capacitor 128 provides for the D-C averaging.

The present invention, therefore, is directed to an optical densitometer providing for a direct linear optical density readout and has a first order compensation provided by the non-linear characteristics of the photoresistive cell 20 and a second order compensation provided by the semiconductor element such as the silicon-controlled rectifier 116 so that the output indication has a linear response even through the intensity of the light directed toward the photoresistive cell 20 has a non-linear characteristic. The silicon-controlled rectifier 116 is across the bridge circuit 112 and controls the current which flows through the output meter 22. The system has inherent stability through the use of a transformer including a center-tapped secondary and the use of an integrating capacitor 128 so that the output indication is stable.

In addition to the above, the optical densitometer of the present invention is extremely versatile in that it can provide output readings in both directions and may therefore be used to provide a variety of tests wherein the specimen becomes more opaque or wherein the specimen becomes less opaque. It is to be appreciated that even though a center null meter is shown, a unidirectional meter may be used and a reversing switch may be used so as to control the current flow through the meter. Although the invention has been described with reference to a particular embodiment, various adaptations and modifications may be made and the invention is only to be limited by the appended claims.

I claim:

1. An optical densitometer for providing a linear output indication of the optical density of a test specimen, including
    a source of light energy to direct light through the test specimen to produce non-linear light intensity variations in accordance with linear changes in the optical density of the specimen,
    a photosensitive element responsive to the light directed through the test specimen and with the photosensitive element having a non-linear characteristic to provide a first order compensation to the non-linear light intensity variations,
    a semiconductor element responsive to the characteristics of the photosensitive element and with the semiconductor element having a non-linear characteristic to provide a second order compensation to the non-linear light intensity variations, and
    means intercoupling the photosensitive element and the semiconductor element for providing a measurement circuit responsive to the non-linear light intensity variations and for producing an output signal having a linear characteristic in relation to the optical density of the specimen.

2. The optical densitometer of claim 1 wherein the semiconductor element is a silicon-controlled rectifier.

3. The optical densitometer of claim 1 wherein the measurement circuit includes a bridge circuit and wherein one element of the bridge circuit is the photosensitive element and wherein the semiconductor element is across the output of the bridge circuit.

4. The optical densitometer of claim 1 additionally including means responsive to the output signal for providing an output indication and wherein the photosensitive element is in a bridge circuit and wherein the semiconductor element is across the bridge circuit to control the output signal applied to the indicator means.

5. An optical densitometer for providing a direct linear readout of the optical density of a test specimen, including
    a measurement circuit including a photosensitive element responsive to light energy for producing an output signal from the measurement circuit and including a semiconductor element to control the value of the output signal,
    a source of light energy for directing light through the test specimen and onto the photosensitive element and with the light received by the photosensitive element having non-linear variations in response to the linear variations in the optical density of the test specimen and with the photosensitive element having characteristics to provide a first order compensation and with the semiconductor element having characteristics to provide a second order compensation to produce the output signal having linear variations in accordance with the optical density of the test specimen, and
    means responsive to the output signal for providing a linear output indication of the optical density of the test specimen.

6. The optical densitometer of claim 5 wherein the semiconductor element is a silicon-controlled rectifier.

7. The optical densitometer of claim 5 wherein the measurement circuit includes a bridge circuit and wherein one element of the bridge circuit is the photosensitive element and wherein the semiconductor element is across the output of the bridge circuit.

8. An optical densitometer for providing a direct linear readout of the optical density of a test specimen, including
    a transformer having a primary winding for connection to a source of line voltage and having a first secondary winding and a second secondary winding having a center tap,
    a bridge circuit including a photosensitive element and with the first secondary winding connected across a first pair of arms of the bridge and with the bridge circuit producing an output signal in accordance with the resistance of the photosensitive element and with the photosensitive element receiving light energy in accordance with the optical density of the test specimen,
    a three-terminal semiconductor device having first and second electrodes and a control element, said first electrode and said control element being connected across a second pair of arms of the bridge, and said second electrode being connected to the center tap of the second secondary winding,
    an output indicator and with the second secondary winding connected across the output indicator and including a pair of unidirectional electrical devices in circuit with the output indicator and the second secondary winding to prevent a direct flow of current through the output indicator,
    means interconnecting the bridge circuit and the output indicator and with the flow of current through the output indicator in accordance with the output from the bridge circuit and in accordance with the control provided by the semiconductor element.

9. The optical densitometer of claim 8 wherein the three-terminal semiconductor element is a silicon controlled rectifier.

10. The optical densitometer of claim 8 wherein the output indicator is an ammeter and additionally including an integrating capacitor in parallel with the ammeter.

11. The optical densitometer of claim 8 wherein the light received by the photosensitive element has a non-linear characteristic in accordance with the optical density of the test specimen and wherein the photosensitive element and the semiconductor element provide first and second order compensation to produce a direct linear readout of optical density of the output indicator.

References Cited

UNITED STATES PATENTS 3,441,352  4/1969  Hughes _____ 356—39X
3,466,450  9/1969  Goodman _____ 250—218

RONALD L. WIBERT, Primary Examiner

P. K. GODWIN, Assistant Examiner

U.S. Cl. X.R.

250—83.3, 206, 218; 324—62, 101; 356—39, 51, 213